(12) United States Patent
Winefordner et al.

(10) Patent No.: US 8,079,610 B2
(45) Date of Patent: Dec. 20, 2011

(54) QUICK RELEASE CAMMING MECHANISM

(75) Inventors: Carl Winefordner, Laguna Beach, CA (US); Frank Hermansen, Laguna Beach, CA (US)

(73) Assignee: Crank Brothers, Inc., Laguna Beach, CA (US)

( * ) Notice: Subject to any disclaimer, the term of this patent is extended or adjusted under 35 U.S.C. 154(b) by 214 days.

(21) Appl. No.: 12/684,008

(22) Filed: Jan. 7, 2010

(65) Prior Publication Data

US 2010/0127472 A1 May 27, 2010

Related U.S. Application Data

(62) Division of application No. 11/732,894, filed on Apr. 5, 2007, now Pat. No. 7,665,928.

(51) Int. Cl.
*B62J 1/08* (2006.01)
*B62K 19/36* (2006.01)

(52) U.S. Cl. .............. 280/288.4; 297/215.13; 280/281.1

(58) Field of Classification Search ............... 280/288.4, 280/281.1; 297/215.13; 224/448; 403/109.1, 403/110, 321, 322.4, 374.5, 377, DIG. 9; 411/409, 435
See application file for complete search history.

(56) References Cited

U.S. PATENT DOCUMENTS

| | | | |
|---|---|---|---|
| 1,186,671 A | 6/1916 | McKenzie | |
| 4,786,022 A | 11/1988 | Grieshaber | |
| 5,383,716 A | 1/1995 | Stewart et al. | |
| 5,526,661 A | 6/1996 | Lin | |
| 5,567,020 A | 10/1996 | Phillips et al. | |
| 5,671,915 A | 9/1997 | Williams | |
| 5,779,119 A * | 7/1998 | Talbot et al. | 224/427 |
| 5,792,046 A | 8/1998 | Dobrovolny | |
| 6,276,760 B1 | 8/2001 | Everett | |
| 6,474,900 B2 * | 11/2002 | Feng | 403/322.4 |
| 6,557,878 B2 * | 5/2003 | Chen | 280/226.1 |
| 6,645,141 B1 * | 11/2003 | Phillips et al. | 600/228 |
| 7,351,000 B2 | 4/2008 | Meggiolan | |
| 7,530,645 B2 | 5/2009 | Takachi | |
| 2005/0236802 A1 * | 10/2005 | Bobrovniczky | 280/276 |
| 2008/0211296 A1 | 9/2008 | Takachi | |
| 2008/0247810 A1 * | 10/2008 | Eason | 403/110 |

* cited by examiner

*Primary Examiner* — Tony H. Winner
*Assistant Examiner* — Wesley Potter
(74) *Attorney, Agent, or Firm* — Haynes and Boone, LLP

(57) ABSTRACT

A quick release camming mechanism is used in a seat post clamp that secures a seat post to a seat tube. Whereas prior art quick release mechanisms have only a single lever, this mechanism has two independently rotatable levers. About half the force is required to independently push either lever closed as to push both levers closed simultaneously. Similarly, about half the force is required to open either lever individually as to open them simultaneously.

23 Claims, 12 Drawing Sheets

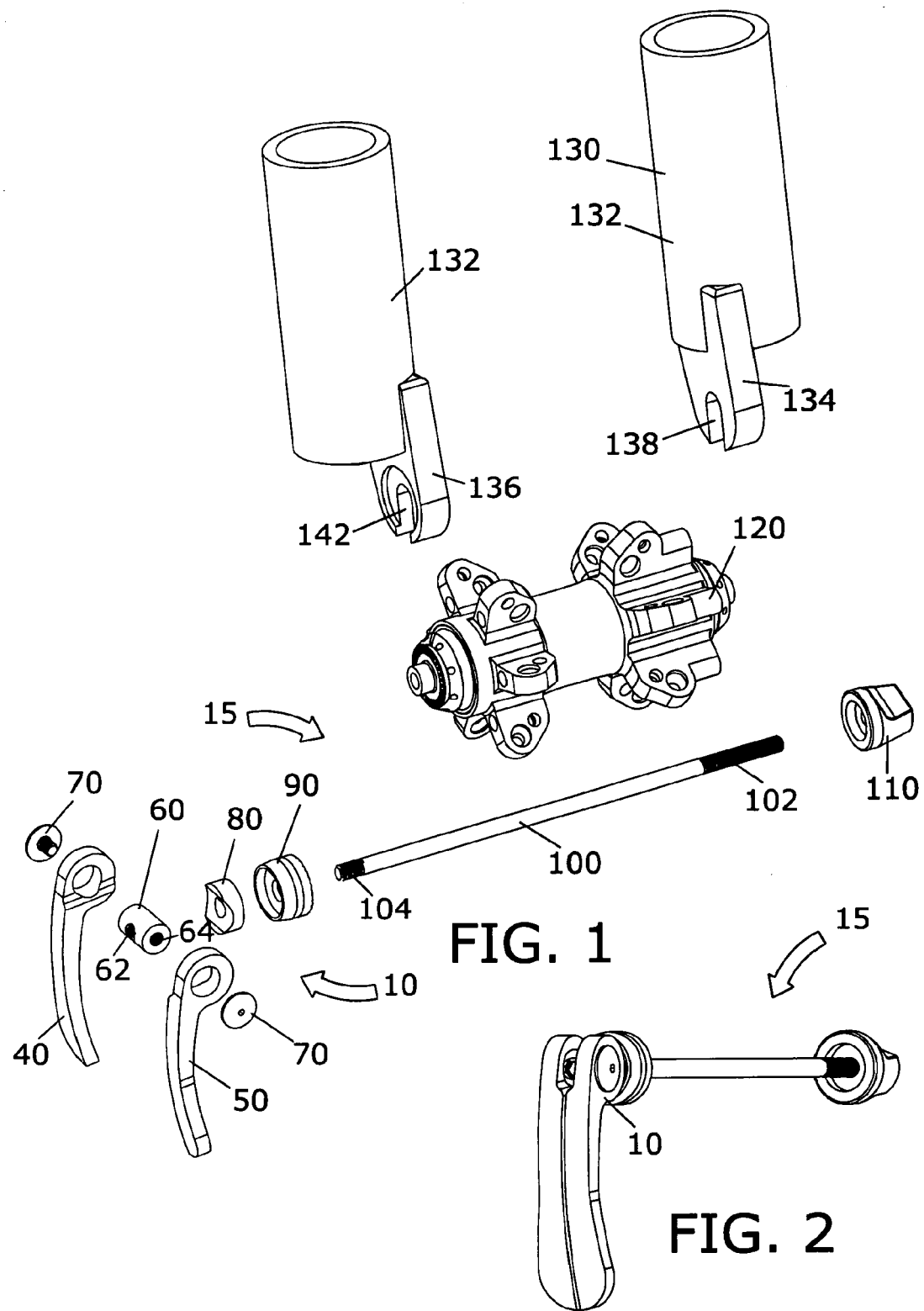

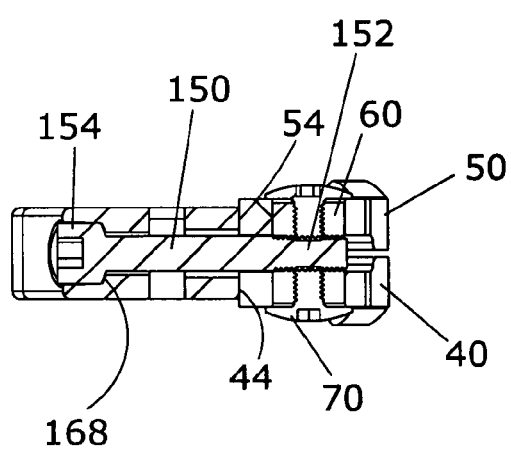
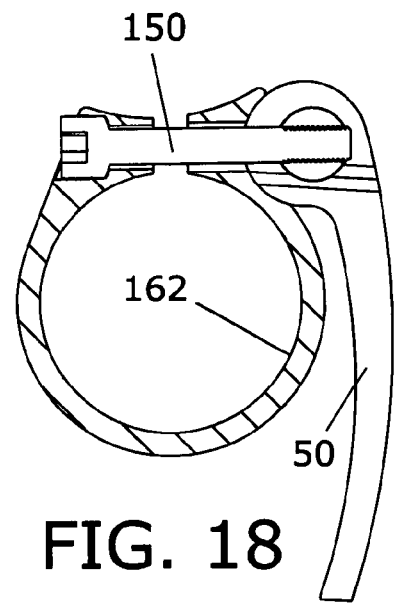
FIG. 17     FIG. 18
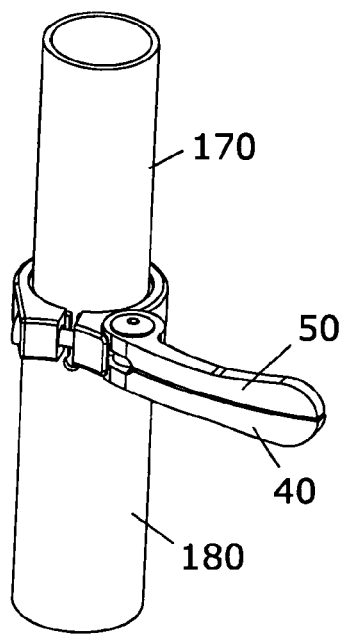
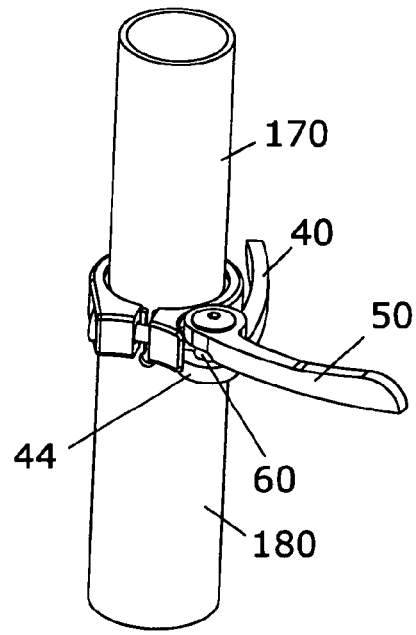
FIG. 19     FIG. 20

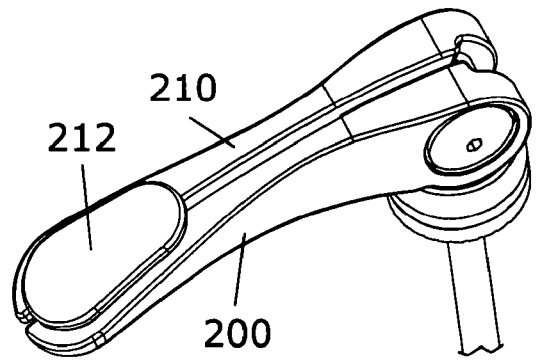
FIG. 24
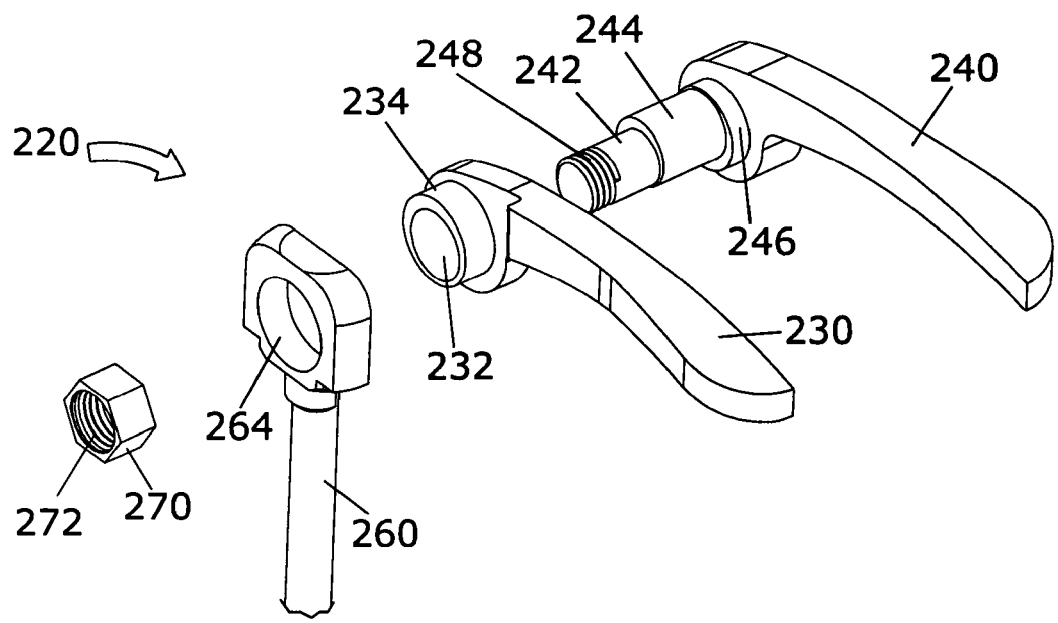
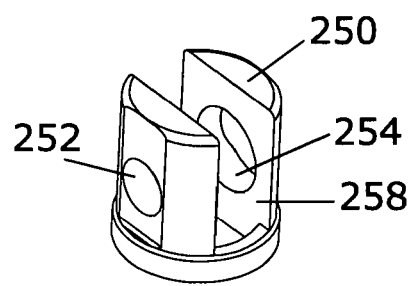
FIG. 25

QUICK RELEASE CAMMING MECHANISM

RELATED APPLICATIONS

This application is a divisional of U.S. patent application Ser. No. 11/732,894, filed Apr. 5, 2007, which is herein incorporated by references for all purposes.

FIELD OF THE INVENTION

The present invention relates to quick release camming mechanisms such as for retaining a seat post to the seat tube of a bicycle frame.

BACKGROUND

Quick-release skewers are well-known and are used on the wheels and frames of better quality bicycles to facilitate their mounting on or removal from the bicycle frame. Quick release skewers use a quick release camming mechanism. Typically, a quick-release skewer comprises a shaft having threaded ends, a large nut on one end, and a camming mechanism on the other end. The hub engages the drop-out slots of a front fork or rear stays (of the frame) immediately inboard of the nut and camming mechanism, so that actuation of the camming mechanism causes the drop-outs to be clamped against the wheel hub. Riders oftentimes remove their wheels for better fitting their bicycle into their car for easier transportation. Riders also remove their wheels when repairing a flat tire or when replacing their tires. Riders also remove their front tire when locking up their bicycle. It is advantageous to have a quick release skewer that does not require tools for these purposes.

Quick release seat posts are also well-known and are used on many better quality off-road bicycles to facilitate quick height adjustment or installation and removal of the seat post relative to the bicycle frame. Quick release seat posts also use a quick release camming mechanism. Typically, a quick release seat post is a quick release clamp or ring that fits around the top of the frame's top tube in order to squeeze the frame top tube around the seat post. Typically, the top tube has a split to allow the clamp to more easily squeeze the top tube onto the seat post. Oftentimes, a rider wants to lower their seat post during steep descents (for safety and control) and raise their seat for other riding to increase their riding efficiency. Riders also oftentimes remove their seat post for better fitting their bicycle into their car for easier transportation, or to prevent the seat and seat post from being stolen. It is advantageous to have a quick release clamp that does not require tools for these purposes.

A disadvantage of conventional quick release skewers and quick release seat post clamps is that they are often difficult to close and open. To adequately clamp a hub or seat post, a certain amount of force is required to close the lever of the quick release. The amount of force may be excessive for people who do not possess great hand strength. Furthermore, the amount of force to release the quick release is, in some cases, even more than the original clamping force, if the quick release has remained in the closed position for a long time. In some cases, a person with strong hands tightens the quick release of a friend's bike, and that friend is later unable to remove their wheels or adjust their seat post. Furthermore, when pulling extremely hard on a quick release lever, the lever can suddenly release and slap the person's hand with painful force.

Quick release seat post clamps work much the same as quick release skewers. They can even share some of the same parts such as the lever and camming mechanism. Quick release seat post clamps present a similar problem as quick release skewers. That is, opening and closing the lever on their seat post clamp can be difficult. Depending on the exact dimensions, design, and material of the seat post and seat tube, it can require significant clamping force to adequately clamp the seat post to the seat tube. In some cases, a stronger rider must regularly assist weaker riders to open and close the seat post clamp. In other cases, a weaker rider may find that their seat post has slipped out of the desired position because they have not been able to apply enough force to the quick release lever.

It is highly desirable to have a skewer and seat post clamp that is easier to open and close, yet provides the same clamping force as conventional skewers and seat post clamps. In some cases, this would not only be a convenience, but allow weaker handed riders independence and confidence to ride on their own, without the worry of not being able to remove and install their wheel to fix a flat tire, or adjust their seat post height. This leads to a more enjoyable ride for many people.

It is also highly desirable to have an improved quick release camming mechanism for many other applications, related to bicycles and to other areas as well.

Accordingly, there is a need for a quick release mechanism that is easier to open and close, allowing for improved products such as a bicycle quick release skewer and a quick release seat post clamp.

SUMMARY

The present invention comprises a quick release mechanism that can be applied, among other things, to seat post clamps. By using two levers according to this novel invention, a quick release seat post clamp that is substantially easier to open and close. The quick release has two levers to open and close instead of one. Each lever requires about half the force of a conventional quick release lever to open and close. Or, with a conventional force applied to each lever, the clamping force is about double. A similar quick release camming mechanism can also be applied to many other products that use a quick release such as a tripod, a ski boot buckle, a patio umbrella, a folding bicycle or stroller, a SCUBA tank strap buckle, fitness equipment, etc.

When the first lever is pivoted closed, the cam of that lever applies a load off-center of the loaded shaft. This causes less tension to be applied to the shaft, which results in less force required. Then, when the second lever is pivoted closed, the cam of that lever applies the rest of the tensile load to the shaft.

If the user so chooses, they can open or close both levers simultaneously, resulting in conventional forces. In this way a person with strong hands could choose to open and close the quick release levers simultaneously, while a person with weaker hands could choose to open and close the levers one at a time.

In another embodiment, there is a lever with a cam that is inside of another lever with a cam. In this way, when either lever is moved independently, only part of the movement takes place compared to moving both levers simultaneously.

Accordingly, it is an object of the present invention to provide a quick-release camming mechanism that allows a quick release skewer and/or a seat post clamp to have two levers for opening and closing. The two levers can either be opened or closed independently, each at a reduced force, or simultaneously at a conventional force.

These and other objects and advantages of the present invention will become apparent to those skilled in the art after having read this detailed description of preferred embodiments which are illustrated by the various drawing figures.

BRIEF DESCRIPTION OF THE DRAWINGS

The aforementioned objects and advantages of the present invention, as well as additional objects and advantages thereof will be more fully understood hereinafter, as a result of a detailed description of preferred embodiments thereof, when taken in conjunction with the following drawings in which:

FIG. 1 is a perspective exploded view of a quick release camming mechanism used in a bicycle skewer assembly in accordance with the preferred embodiment;

FIG. 2 is a perspective view of the quick release camming mechanism used in a bicycle skewer;

FIG. 17 is a cross-sectional view of the quick release camming mechanism used in the seat post clamp assembly shown in FIG. 15;

FIG. 18 is a cross-sectional view of the quick release camming mechanism used in the seat post clamp assembly shown in FIG. 16;

FIG. 19 is a perspective view of the quick release camming mechanism used in the seat post clamp assembly with both levers in the open position;

FIG. 20 is a perspective view of the quick release camming mechanism used in the seat post clamp assembly with one lever in the closed position and one lever in the open position;

FIG. 24 is a perspective view of the alternative embodiment quick release camming mechanism used in the quick release skewer with both levers closed;

FIG. 25 is a perspective exploded view of another alternative embodiment quick release camming mechanism;

Figure 3:
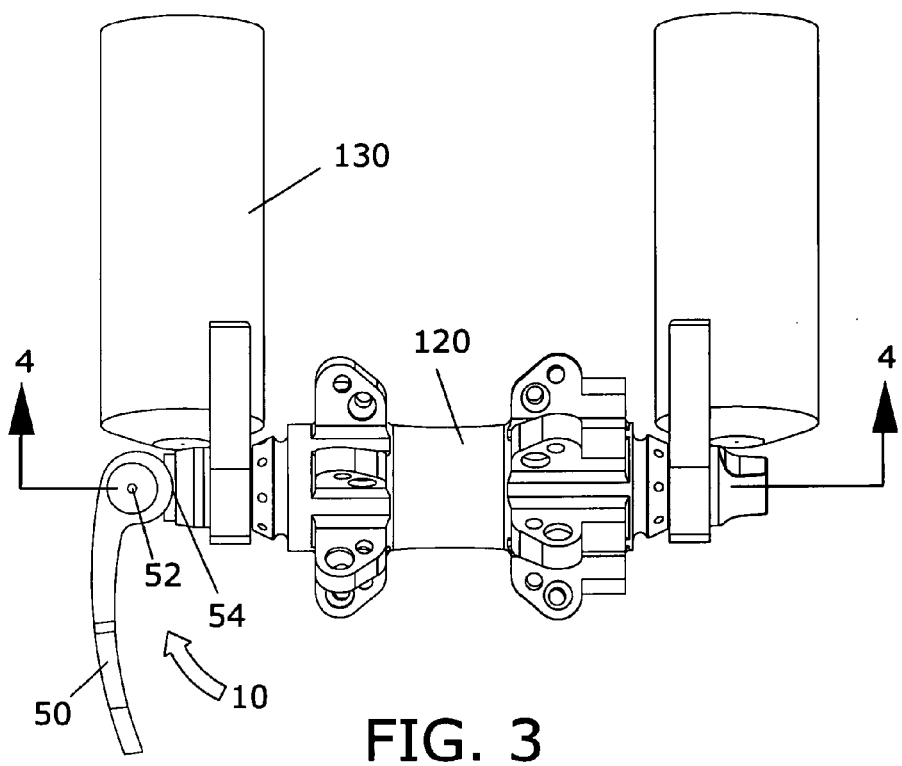
FIG. 3 is a front view of the quick release camming mechanism used in a skewer, hub, and fork assembly in accordance with the preferred embodiment.

The description herein refers to reference numerals in the accompanying drawings and these reference numerals refer to the parts therein having the following definitions:

| REFERENCE NUMERALS IN DRAWINGS | | | |
|---|---|---|---|
| 10 | mechanism | 12 | gap |
| 15 | skewer | 20 | mechanism |
| 25 | skewer | 30 | mechanism |
| 35 | seat post clamp | 40 | first lever |
| 42 | pivot point | 44 | cam surface |
| 50 | second lever | 52 | pivot point |
| 54 | cam surface | 60 | pin |
| 62 | thread | 64 | thread |
| 70 | screw | 72 | thread |
| 80 | liner | 82 | surface |
| 84 | surface | 90 | cup |
| 100 | shaft | 102 | thread |
| 104 | thread | 110 | end cap |
| 112 | thread | 120 | hub |
| 122 | end cap | 124 | end cap |
| 130 | fork | 132 | leg |
| 134 | dropout | 136 | dropout |
| 138 | slot | 142 | slot |
| 150 | shaft | 152 | thread |
| 154 | head | 160 | ring |
| 162 | inner diameter | 164 | lip |
| 166 | gap | 168 | surface |
| 170 | seat post | 180 | seat tube |
| 182 | top | 200 | lever |
| 210 | lever | 212 | flange |
| 220 | mechanism | 230 | lever |
| 232 | hole | 234 | cam surface |
| 240 | lever | 242 | boss |
| 244 | cam surface | 246 | boss |
| 248 | thread | 250 | cup |
| 252 | hole | 254 | hole |
| 258 | slot | 260 | shaft |
| 264 | hole | 270 | nut |
| 272 | thread | 280 | mechanism |
| 285 | skewer | 290 | lever |
| 294 | cam surface | 300 | lever |
| 304 | cam surface | | |

DETAILED DESCRIPTION

Figure 22:
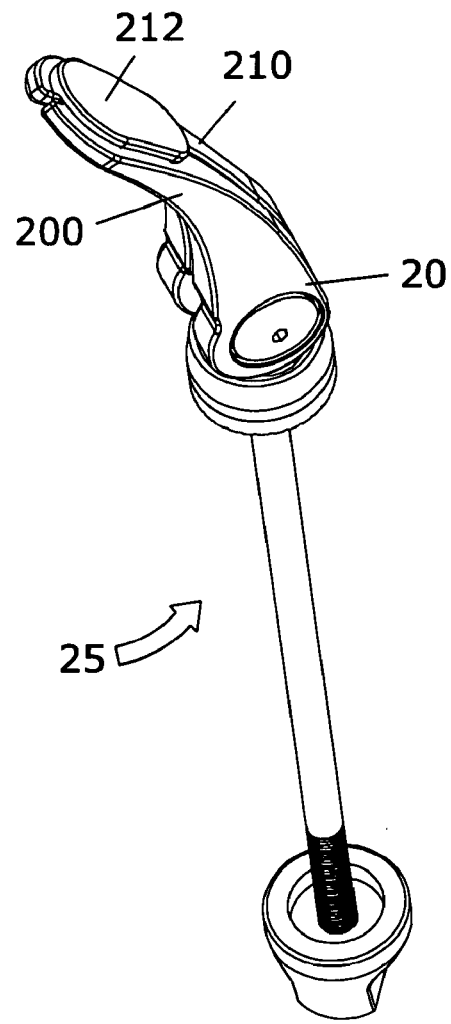
FIG. 22 is a perspective view of another alternative embodiment quick release camming mechanism used in the quick release skewer with both levers open.
Figure 23:
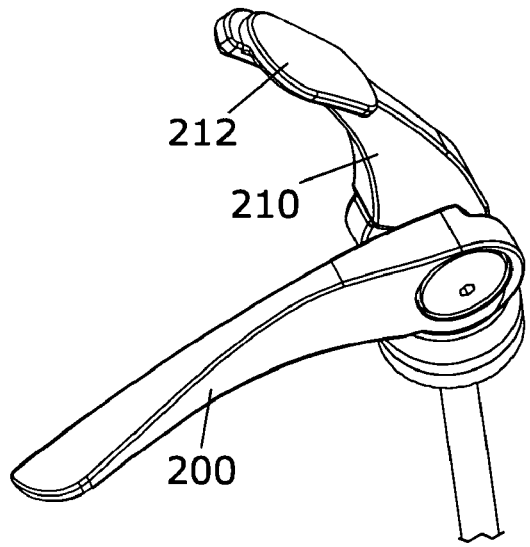
FIG. 23 is a perspective view of the alternative embodiment quick release camming mechanism used in the quick release skewer with one lever open and one lever closed.
Figure 26:
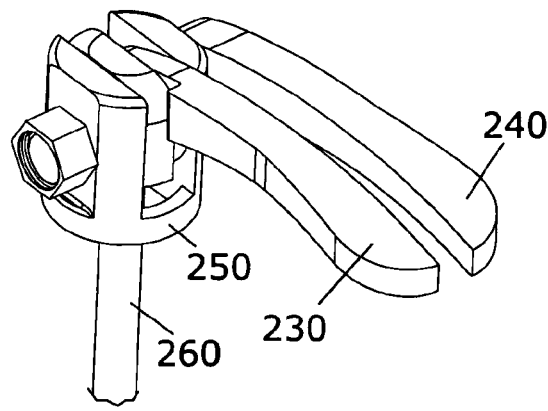
FIG. 26 is a perspective view of the alternative embodiment quick release camming mechanism shown in FIG. 25.
Figure 27:
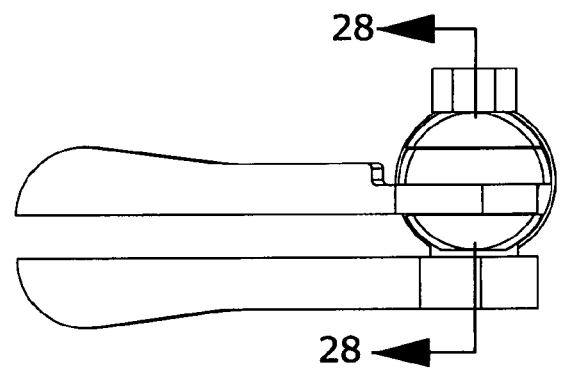
FIG. 27 is a top view of the alternative embodiment quick release camming mechanism shown in FIG. 25.
Figure 28:
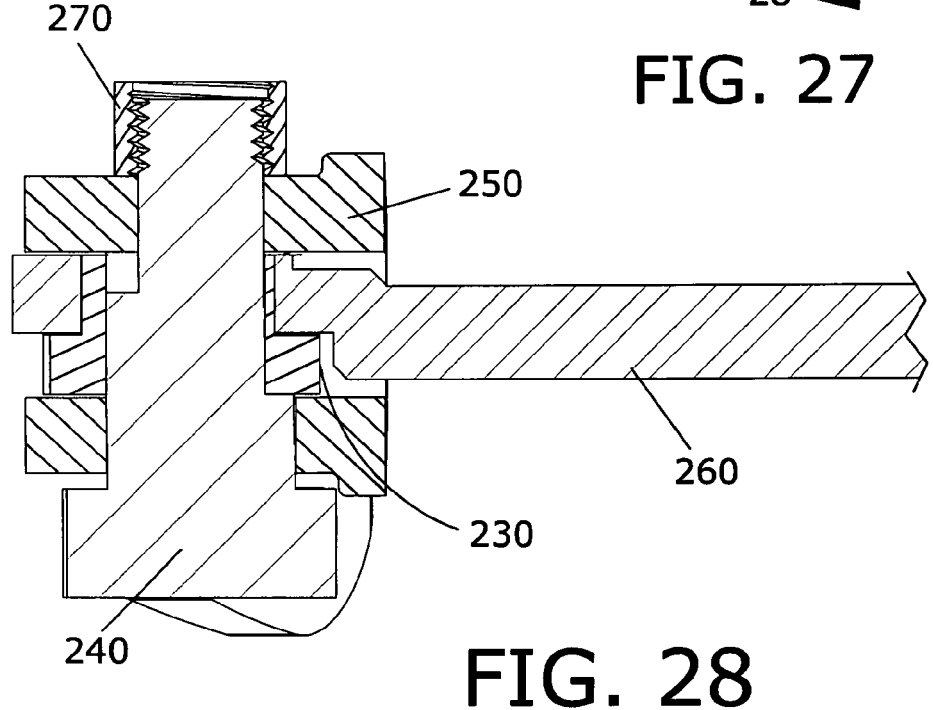
FIG. 28 is a cross-sectional view of the alternative quick release camming mechanism shown in FIG. 27.
Figure 29:
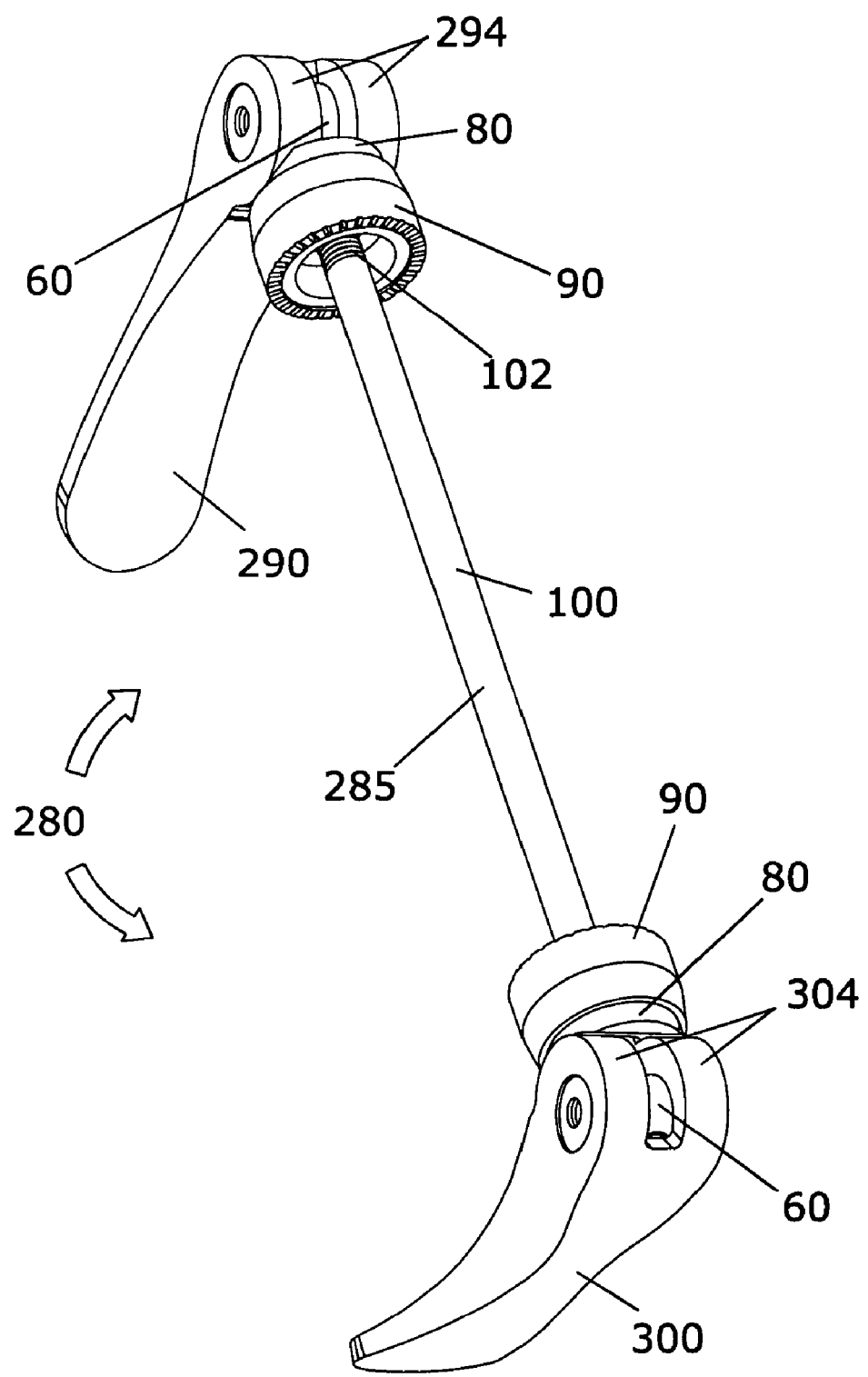
FIG. 29 is a perspective view of yet another alternative quick release camming mechanism.

The present invention may be understood by referring to FIGS. 1-29. Referring first to FIGS. 1 to 11, it will be seen that the foregoing and other objects are attained, according to the present invention by a quick release camming mechanism 10 used in a bicycle quick release skewer 15 which is comprised of a shaft 100, an end cap 110, levers 40 and 50, two screws 70, a pin 60, a liner 80, and a cup 90. Skewer 15 secures a hub 120 to a fork 130. Whereas prior art quick release skewers have only a single lever, this novel skewer 15 has two independent levers. About half the force is required to independently push either lever 40 or 50 closed as is required to push both levers closed simultaneously. Similarly, about half the force is required to open either lever individually as is required to open them simultaneously. This is because about half the shaft 100 tensile load and about half of the friction is applied when one lever 40 or 50 is opened individually, compared to opening or closing both levers simultaneously. A similar quick release camming mechanism 30 works well for a quick release seat post clamp 35, shown in FIGS. 12-21, with similar advantages. FIGS. 22-24 show alternative embodiment quick release camming mechanism 20 used in a skewer 25. FIGS. 25-28 show alternative embodiment quick release camming mechanism 220. FIG. 29 shows another alternative quick release camming mechanism 280 used in a skewer 285.

As shown in FIG. 1, quick release camming mechanism 10 used in a skewer 15 is comprised of a shaft 100, an end cap 110, levers 40 and 50, two screws 70, a pin 60, a liner 80, and a cup 90. A bicycle fork 130 has legs 132, dropouts 134 and 136 with slots 138 and 142 respectively, as is well-known in the prior art. Quick release skewer 15 secures hub 120 to fork 130. Shaft 100 has male threaded ends 102 and 104. Both female threads 62 and 64 run all the way through pin 60. Spokes and a rim are not shown. Effectively, cup 90 via liner 80 is the receiving or moving member for levers 40 and 50.

In FIG. 2, quick release camming mechanism 10 is shown used in a bicycle quick release skewer 15.

In FIG. 3, quick release camming mechanism 10 on skewer 15 is shown securing hub 120 to fork 130. Levers 40 and 50 are in the closed position. Lever 50 has a pivot point 52 and a cam surface 54. Lever 40 has a similar pivot point 42 and cam surface 44.

Figure 4:
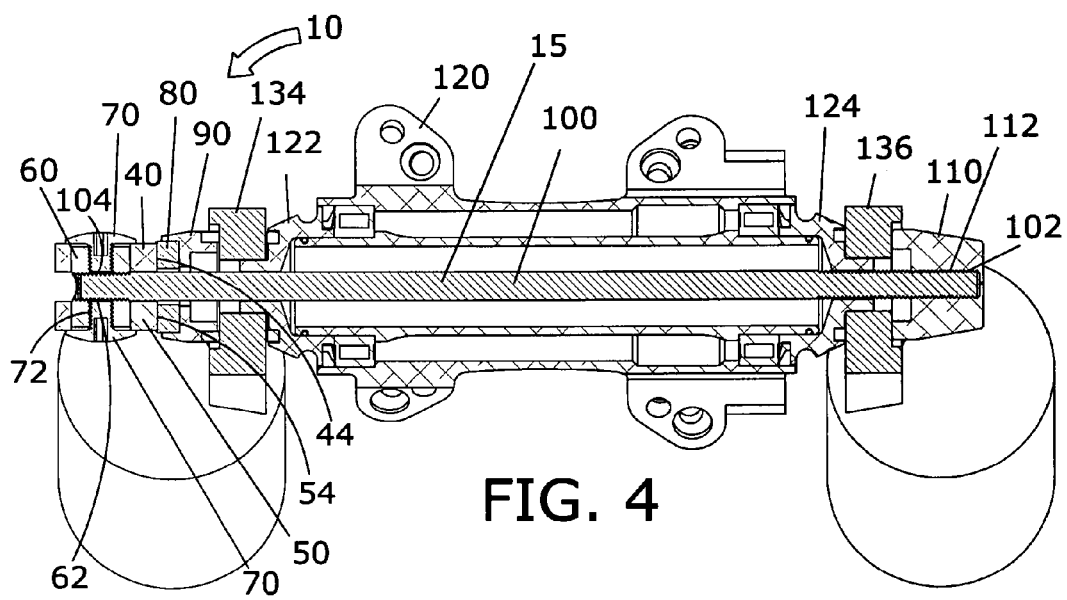
FIG. 4 is a cross-sectional view of the quick release camming mechanism used in the skewer, hub and fork assembly shown in FIG. 3.

In FIG. 4, skewer 15 is shown securing hub 120 to fork 130. Shaft 100 is in tension, which rigidly pulls end cap 110 and cup 90 together. Cam surfaces 44 and 54 of closed levers 40 and 50 respectively push against liner 80 which pushes against cup 90, thus pulling pin 60 outward. The skewer 15 rigidly clamps fork dropouts 134 and 136 against hub end caps 122 and 124, securing the fork 130 to hub 120. Pin 60 is connected to shaft 100 via threads 62 and 104, respectively. End cap 110 is connected to shaft 100 via threads 112 and 102, respectively. Screws 70 are connected to pin 60 via threads 72 and 64, respectively.

Figure 5:
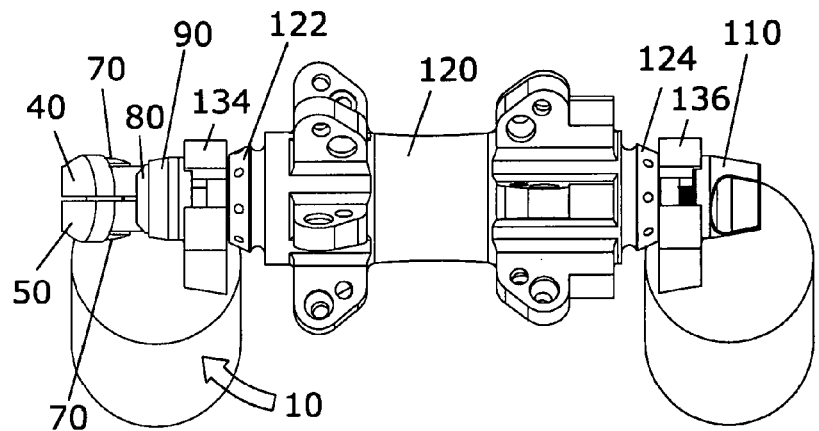
FIG. 5 is a bottom view of the quick release camming mechanism used in the skewer, hub, and fork assembly shown in FIG. 3.

In FIG. 5, skewer 15 is shown securing hub 120 to dropouts 134 and 136 of fork 130. Levers 40 and 50 are closed, squeezing together liner 80, cup 90, dropout 134, end caps 122 and 124 of hub 120, dropout 136, and end cap 110. Two screws 70 retain levers 40 and 50.

Figure 6:
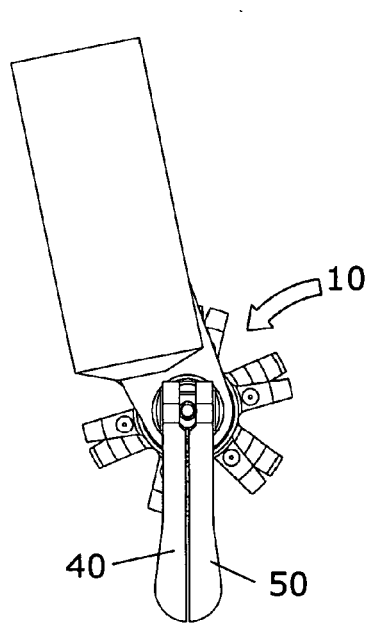
FIG. 6 is a side view of the quick release camming mechanism used in the skewer, hub, and fork assembly shown in FIG. 3.
Figure 7:
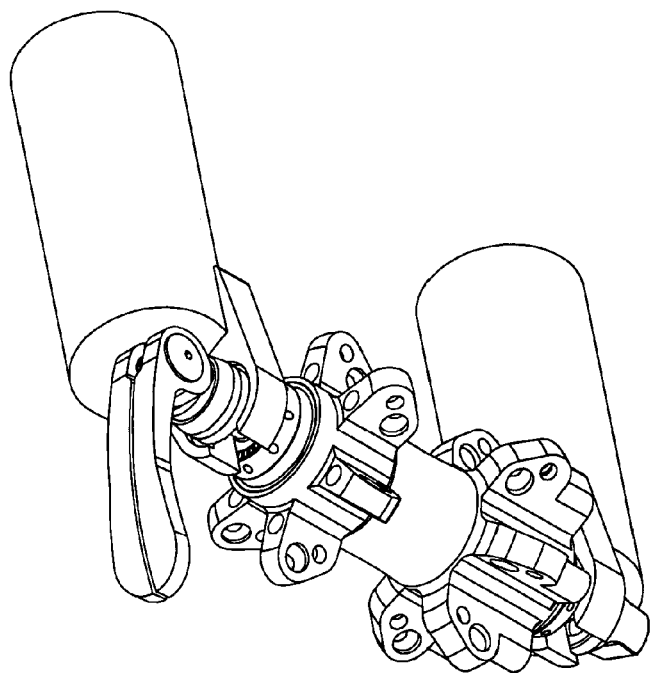
FIG. 7 is a perspective view of the quick release camming mechanism used in the skewer, hub, and fork assembly shown in FIG. 3.

In FIGS. 6 and 7, skewer 15 is shown with both levers 40 and 50 closed.

Figure 8:
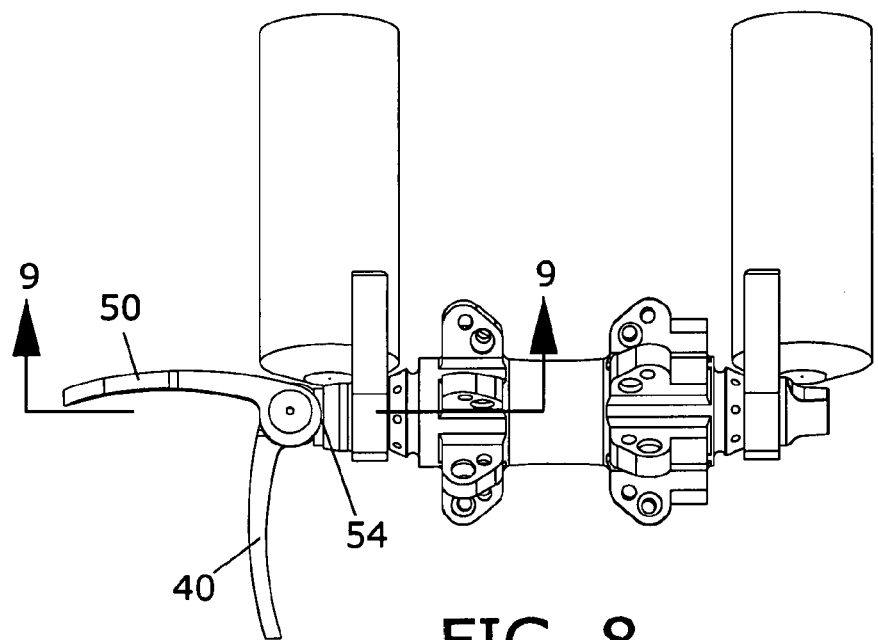
FIG. 8 is front view of the quick release camming mechanism used in the skewer, hub, and fork assembly of the preferred embodiment with one of the levers in the open position and one in the closed position.

In FIG. 8, skewer 15 is shown with lever 40 in the closed position and lever 50 in the open position. About half the force was required to push lever 40 closed as to push both levers 40 and 50 closed at the same time. Similarly, about half the force was required to open either lever 40 or 50 individually as to open them simultaneously. This is because approximately only half the tensile load and about half of the friction is applied when one lever of the quick release camming mechanism 10 is opened or closed at a time, compared to opening or closing both levers simultaneously. As each lever is closed, cam surfaces 44 and 54 gradually push more and more against liner 80, until the peak movement at the end of the motion. As each lever is opened, there is a gradual opening movement that releases all the squeezing force (with both levers opened). Note that if levers 40 and 50 were fused together, then quick release skewer 15 would become a typical quick release skewer known in the prior art. However, by having levers 40 and 50 able to act independently, the opening and closing forces can be much less than for quick release skewers of the prior art.

Figure 9:
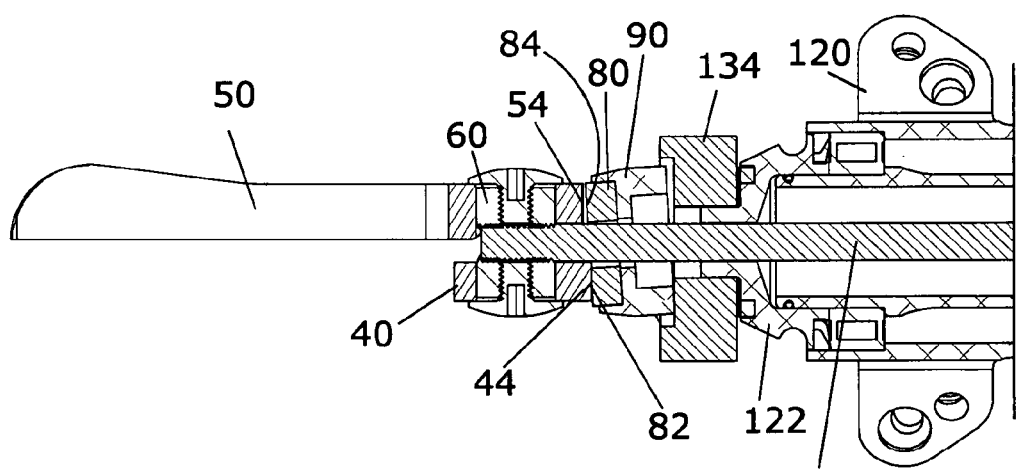
FIG. 9 is a partial cross-sectional view of the quick release camming mechanism used in the skewer, hub and fork assembly shown in FIG. 8.

In FIG. 9, skewer 15 is shown with lever 40 in the closed position and lever 50 in the open position. Notice that cam 44 of lever 40 pivots around pin 60 and off-center from shaft 100. This off-center pivot causes only about half of the cam motion to be applied to shaft 100. In other words, shaft 100 is only pulled about half as far as if both levers were closed, and this is the reason that it only requires about half the force to close or open one lever as compared to opening or closing both levers simultaneously. As the first lever is closed, liner 80, pin 60 and shaft 100 (and their threaded connection) flex enough that shaft 100 is pulled less than when both levers are closed simultaneously. This causes less tensile load to be applied, as well as less friction. In order to better demonstrate how this novel quick release works, liner 80 and cup 90 are shown angled, caused by pressured exerted from cam surface 44 against liner surface 82. In actual use, there would be far more pressure applied to one side of cup 90 via liner surface 82 than the remaining side of cup 90 until lever 50 was also closed. That is because cam 54 is not exerting as much force against liner surface 84, being that lever 50 is still in the open position.

Figure 10:
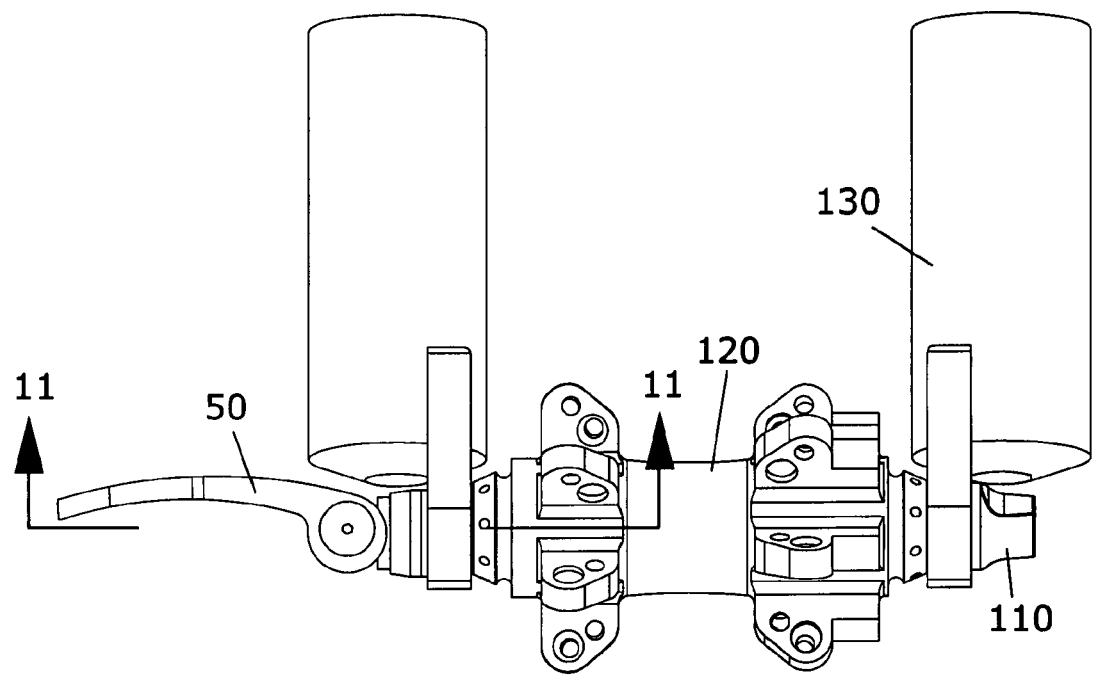
FIG. 10 is a front view of the quick release camming mechanism used in the skewer, hub, and fork assembly of the preferred embodiment with both of the levers in the open position.

In FIG. 10, both levers 40 and 50 are in the open position and end cap 110 can be easily loosened by hand so that hub 120 can be easily removed from fork 130.

Figure 11:
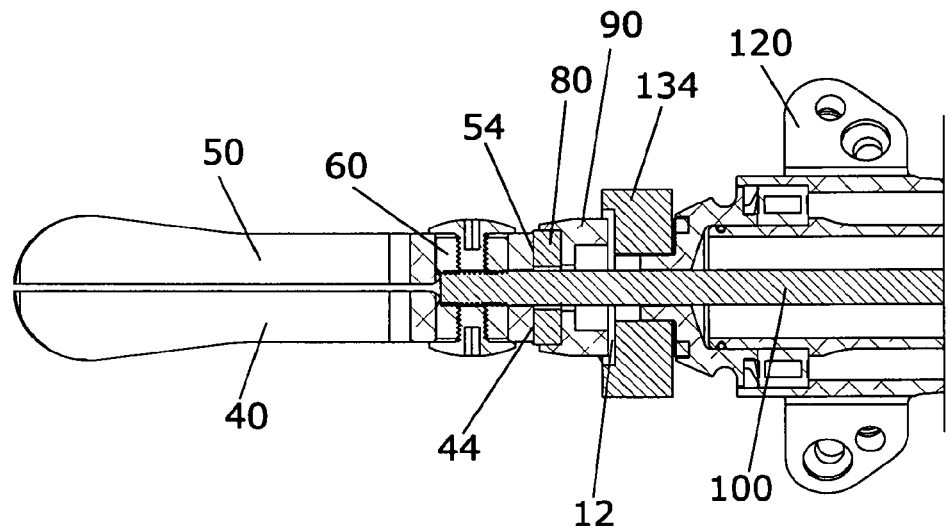
FIG. 11 is a partial cross-sectional view of the quick release camming mechanism used in the skewer, hub and fork assembly shown in FIG. 10.

In FIG. 11, cam surfaces 44 and 54 of the open levers 40 and 50 have allowed slack in the quick release system, shown here by a gap 12 between cup 90 and dropout 134. Tension has been released from shaft 100. This slack allows end cap 110 to be easily loosened by hand so that hub 120 can be removed from fork 130.

Figure 12:
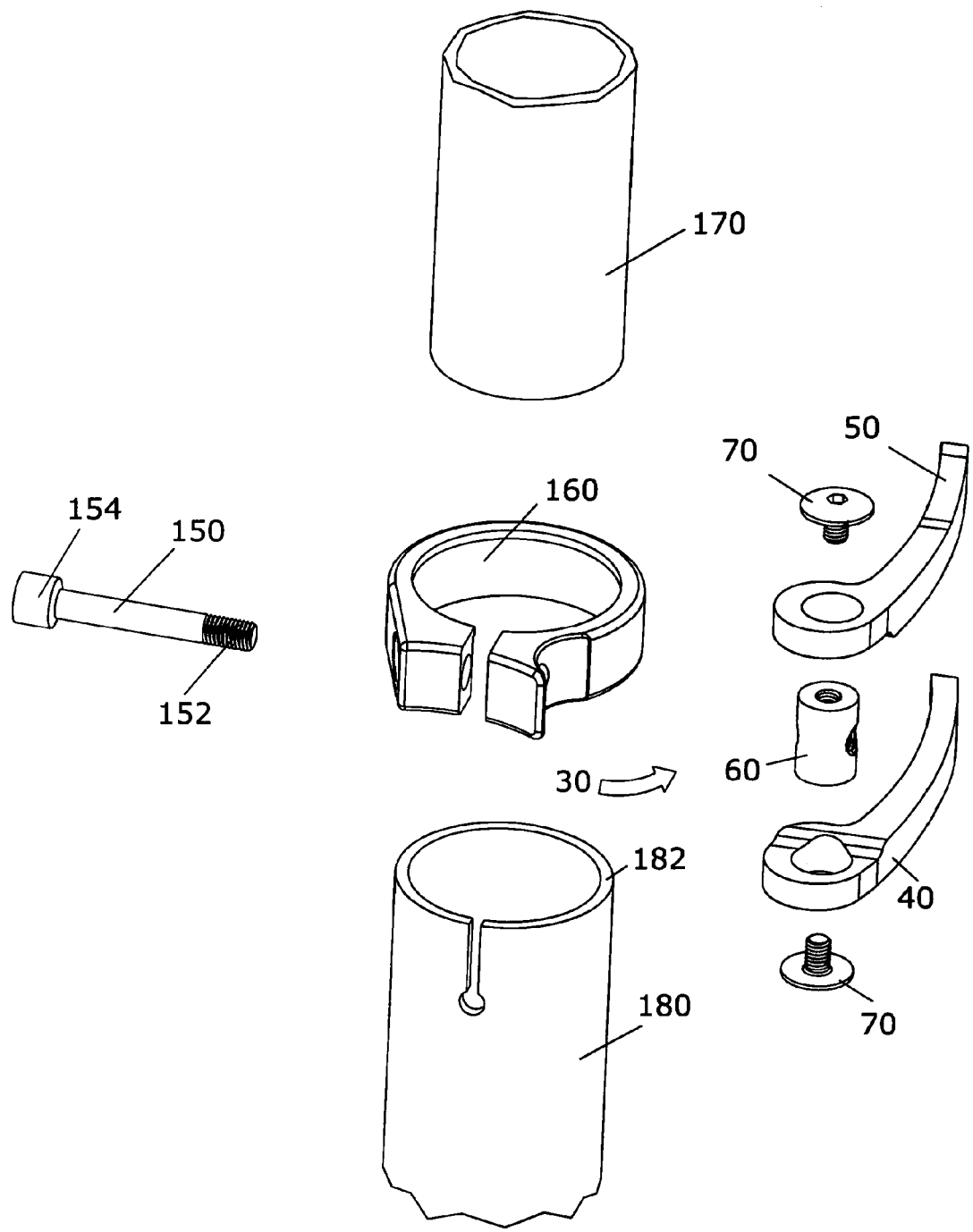
FIG. 12 is an exploded perspective view of an alternative embodiment of the quick release mechanism used in a quick release seat post clamp assembly.

FIG. 12 shows an alternative quick release camming mechanism 30 that is used in a seat post clamp 35 and is comprised of a ring 160, a shaft 150, levers 40 and 50, a pin 60, and two screws 70. Shaft 150 has a thread 152 and a head 154. Also shown is a seat tube 180 of a bicycle frame, and a seat post 170. Effectively, ring 160 is the receiving or moving member for levers 40 and 50.

Figure 13:
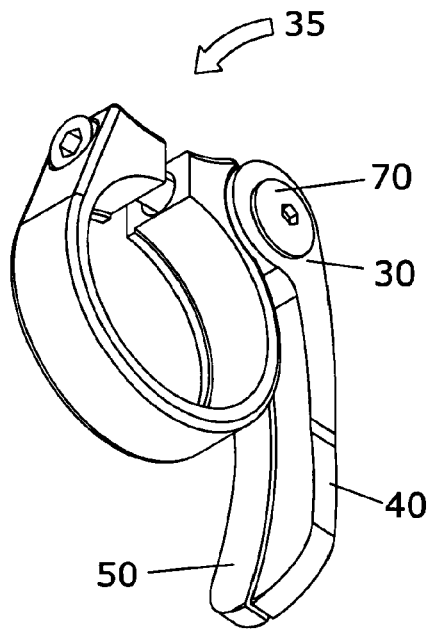
FIGS. 13 and 14 are perspective views of the quick release camming mechanism used in the seat post clamp assembly.

In FIG. 13, levers 40 and 50 of the quick release camming mechanism used in seat post clamp 35 are shown in the closed position. Screw 70 secures lever 40 to pin 60. Another screw 70 secures lever 50 to pin 60.

Figure 14:
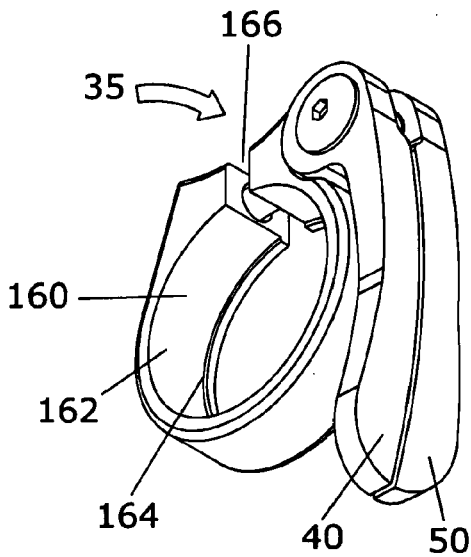

In FIG. 14, levers 40 and 50 of seat post clamp 35 are in the closed position. When seat post clamp 35 is placed on bicycle seat tube 180, lip 164 of ring 160 contacts the top 182 of seat tube 180 and properly positions seat post clamp 35. As levers 40 and 50 are moved from the open position to the closed position, diameter 162 of ring 160 is reduced, thus tightening seat post clamp 180 around seat post 170. Gap 166 of ring 160 allows ring 160 to more easily flex during the diameter reduction.

Figure 15:
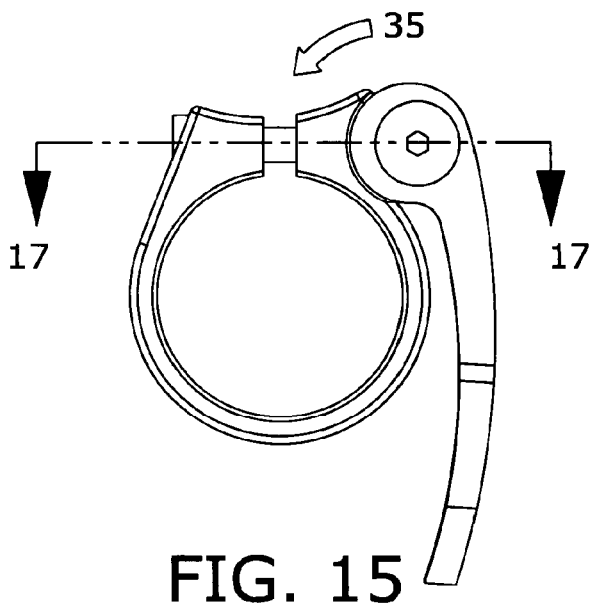
FIG. 15 is a top view of the quick release camming mechanism used in the seat post clamp assembly shown in FIG. 13.
Figure 16:
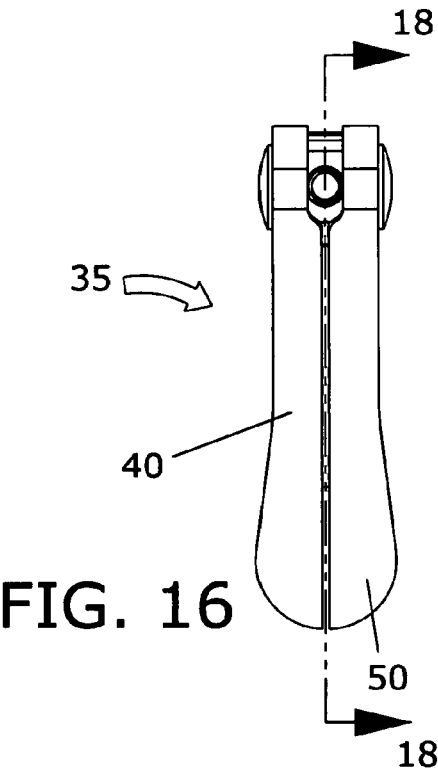
FIG. 16 is a side view of the quick release camming mechanism used in the seat post clamp assembly shown in FIG. 13.

FIGS. 15 and 16 also show levers 40 and 50 are in the closed position.

In FIGS. 17 and 18, levers 40 and 50 are seen in the closed position, and shaft 150 is in tension. Thread 152 connects shaft 150 to pin 60, while head 154 of shaft 150 mates with surface 168 of ring 160. Cam surfaces 44 and 54 of levers 40 and 50 are shown. If levers 40 and 50 were fused together, then this seat post clamp would be configured as in the prior art. However, because levers 40 and 50 are independent, the force to open and close seat post clamp 35 is significantly reduced when levers 40 and 50 are operated independently. The function of quick release seat post 35 is analogous to the quick release skewer 15, and, in fact, some of the same parts can be used in both embodiments, namely levers 40 and 50, pin 60, and screws 70. Quick release camming mechanism 10 is essentially the same as camming mechanism 30, but used on a different bicycle component (a seat post clamp instead of a skewer).

In FIG. 19, levers 40 and 50 of seat post clamp 35 are shown in the open position. In this position, seat post 170 can freely be moved up and down with seat tube 180 to adjust the height of the seat post. Riders often want to change the height of their seat post for changing riding conditions. For example, a mountain biker may want to lower their seat for steep descents.

In FIG. 20, seat post clamp 35 is shown with lever 40 in the closed position and lever 50 in the open position. Lever 40 cam 44 pivots around pin 60 and off-center from shaft 150. This off-center pivot causes only about half of the cam motion to be applied to shaft 150. In other words, shaft 150 is only pulled about half as far as if both levers were closed, and this is the reason that it only requires about half the force to close or open one lever as compared to opening or closing both levers simultaneously. As the first lever is closed, pin 60 and shaft 150 (and their threaded connection) flex enough that shaft 150 is pulled less than when both levers are closed simultaneously. This causes less tensile load to be applied, as well as less friction. With one lever closed at about half the usual closing force, seat post 170 is clamped to seat tube 180 with only about half of the usual clamping force. Then, by closing the other lever with about half of the usual closing force, the seat post 170 is secured to seat tube 180.

FIG. 20 could also represent lever 50 having just been pulled open (instead of lever 40 having just been pushed closed). In that case, the opening force was significantly less than if the user had pulled open both levers 40 and 50 simultaneously.

Figure 21:
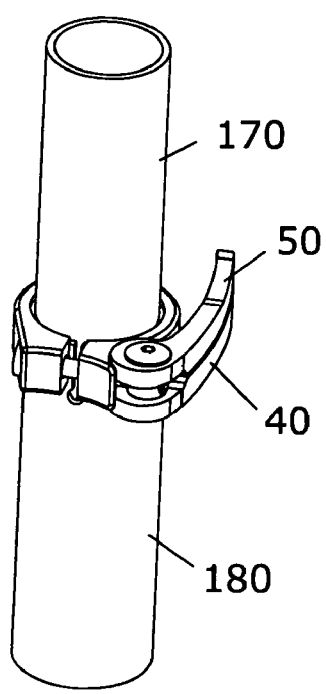
FIG. 21 is a perspective view of the quick release camming mechanism used in the seat post clamp assembly with both levers in the closed position.

In FIG. 21, levers 40 and 50 of seat post clamp 35 are in the closed position, thus fully clamping seat post 170 to seat tube 180. Significantly less force was required to close lever 50 after lever 40 was already closed than if levers 40 and 50 were closed simultaneously. Similarly, it requires significantly less force to pull open either lever 40 or 50 separately than simultaneously. This allows people, particularly those with weak hands, to still clamp and unclamp their seat post.

FIGS. 22-24 show alternative quick release camming mechanism 20 is used in a skewer alternative embodiment 25 and is similar to skewer 15 except that levers 200 and 210 are designed to operate somewhat less independently than levers 40 and 50. Lever 200 is similar to lever 50, but lever 210 has a flange 212 that lever 40 does not have. If lever 200 is pushed closed first, then lever 200 moves independently of lever 210. If, however, lever 210 is pushed closed first, then both levers 200 and 210 are pushed closed simultaneously. Conversely, if lever 210 is opened first, then lever 210 moves independently of lever 200. If, however, lever 200 is pulled open first, then both levers 200 and 210 are pulled open simultaneously. In this way, it is a little easier to open and close the levers simultaneously, yet it is still possible to open and close them independently to achieve lower pull and push forces, when desired. Effectively, cup 90 via liner 80 is the receiving or moving member for levers 200 and 210.

In FIGS. 25-28, another alternative quick release camming mechanism 220 is comprised of two levers 230 and 240, a cup 250, a shaft 260, and a nut 270. As with the other embodiments, this quick release camming mechanism 220 has two levers which can be operated together or independently. Cam surface 234 of lever 230 fits into hole 264 of shaft 260. Lever 230 and shaft 260 are then placed through slot 258 of cup 250. Then, boss 242 of lever 240 fits through hole 254 of cup 250, through hole 232 of lever 230, and through hole 252 of cup 250. Boss 246 is concentric with boss 242. Thread 272 of nut 270 secures lever 240 in place via thread 248. Cam 244 acts on lever 230 via hole 232, while cam 234 acts on hole 264 of shaft 260. Essentially, this mechanism is a cam within a cam. Effectively, lever 230 is the receiving or moving member for lever 240, and shaft 260 is the receiving or moving member for lever 230.

If both levers 230 and 240 are in the open position and lever 230 is closed first, then cam 234 pulls shaft 260 upwards relative to cup 250. Then, as lever 240 is closed, cam 244 pulls both lever 230 and shaft 260 upwards further relative to cup 250. Instead, if lever 240 is closed first, then cam 244 pulls both lever 230 and shaft 260 upwards relative to cup 250. Then, as lever 230 is closed, cam 234 pulls shaft 260 upwards further relative to cup 250. Opening quick release camming mechanism 220 is carried out in an opposite sequence. Cams 234 and 244 could be similar to provide equal movement of the mechanism by levers 230 and 240 or cams 234 and 244 could be different to provide a different mechanism movement, mechanical advantage, and feel. This alternative embodiment quick release camming mechanism 220 could be incorporated into a quick release skewer, quick release seat post, or many other quick release products.

It would be easy to add a third lever to quick release camming mechanism 220 to further divide the total cam motion by three levers instead of two. This could be a cam within a cam within a cam.

In FIG. 29 shows alternative quick release camming mechanism 280 is used in a skewer alternative embodiment 285. Instead of two levers appearing side by side as with the previously disclosed embodiments, camming mechanism 280 has levers located in two opposed positions. Specifically, on one end of shaft 100 is a lever 300, a pin 60, a liner 80, and a cup 90. Thread 62 of pin 60 is connected to thread 104 (shown in FIG. 1) of shaft 100. Lever 300 is captured by shaft 100's connection to pin 60. Lever 300 has a cam surface 304 that provides about half the motion of a prior art lever cam. On the other end of shaft 100 is a lever 290, another pin 60, another liner 80, and another cup 90. Thread 62 of pin 60 is connected to thread 102 of shaft 100 lever 290 is captured by shaft 100's connection to pin 60. Lever 290 has a cam surface 294 that provides about half the motion of a prior art lever cam. Lever 290 can be exactly the same as lever 300. Each end of skewer 285 has a quick release mechanism that is known in the prior art, however by using this mechanism on both ends of shaft 100 instead of a mechanism on one end and an end cap on the other, skewer 285 is novel and retains many of the workings and advantages of the previously disclosed embodiments. Levers 290 and 300 require about half the force to open and close independently, as compared to simultaneously. A similar camming mechanism 280 could be incorporated into a quick release seat post clamp or other quick release applications.

OTHER EMBODIMENTS

Those skilled in the art will readily perceive other embodiments and other applications. For example, there are numerous quick release camming mechanisms possible that would use at least two levers wherein the first lever applies part of the load and the next lever(s) applies the remaining load. In the preferred embodiment, cup 90 via liner 80 is the receiving or moving member for levers 40 and 50, but it would be possible to split cup 90 into two or more parts (receiving or moving members). Furthermore, while the preferred embodiment shows levers 40 and 50 pivoting concentrically around pin 60, the mechanism could also work if levers 40 and 50 did not pivot concentric to each other. Furthermore, there are many applications for use of these novel quick release camming mechanisms beyond bicycle skewers and seat post clamps. In particular, it would be highly advantageous to use these quick release camming mechanisms for any application where there is a desire to achieve and release a high cammed load with less effort. Some examples are quick releases used in fitness equipment, bicycle racks on cars, tripods, folding bicycles, ski boot buckles, children's fold-up push scooters, patio umbrellas, bicycle shock absorber mounts, SCUBA tank straps, military applications, and adjustable bicycle handlebar stems. Therefore, the present invention is not necessarily limited for use on bicycle components. The scope hereof is limited only by the appended claims and their equivalents.

We claim:

1. A clamp system for securing and unsecuring a seat post, comprising:
   a ring clamp comprising a first opening configured to receive a seat tube, wherein the seat post is configured to slide into the seat tube, a second opening at one end of the ring clamp and perpendicular to the first opening, and an inwardly curved surface at the one end;
   a shaft configured to fit into the second opening of the ring clamp;
   a pin having an opening configured to engage a first end of the shaft;
   a first lever having a cam surface and an opening on one end and a lever portion on an opposite end, wherein the opening engages a first portion of the pin; and
   a second lever having a cam surface and an opening on one end and a lever portion on an opposite end, wherein the opening of the second lever engages a second portion of the pin, wherein the inwardly curved surface of the ring clamp engages the cam surfaces of the first and second levers, and wherein the first and second levers are independently rotatable about the pin and with respect to each other to move the ring clamp for securing or unsecuring the seat post and the seat tube.

2. The clamp system of claim 1, wherein the pin further comprises a second opening along an axis of rotation of the first and second levers.

3. The clamp system of claim 2, further comprising a screw adapted to engage the second opening of the pin to secure at least the first lever to the pin.

4. The clamp system of claim 3, further comprising a second screw adapted to engage the second opening of the pin to secure the second lever to the pin.

5. The clamp system of claim 1, wherein the first end of the shaft has a threaded portion corresponding to a threaded portion in the opening of the pin.

6. The clamp system of claim 1, wherein the shaft is rotatable in the second opening of the ring clamp.

7. The clamp system of claim 1, wherein the seat post and the seat tube are bicycle components.

8. The clamp system of claim 1, wherein the lever portions of the first and second levers are to be rotated toward the ring clamp for the securing.

9. The clamp system of claim 1, wherein the lever portions of the first and second levers are to be rotated away from the ring clamp for the unsecuring.

10. The clamp system of claim 1, wherein an axis of rotation of the first and second levers is to be perpendicular to an axis of rotation of the shaft.

11. The clamp system of claim 1, wherein an axis of rotation of the first and second levers is to be parallel to an axis of rotation of the seat post.

12. The clamp system of claim 1, wherein the lever portions of the first and second levers are curved inward toward the ring clamp.

13. The clamp system of claim 1, wherein the seat tube comprises an opening configured to reduce the diameter of the seat tube when the ring clamp is moved by the first and second levers to tighten the seat tube against the seat post.

14. A clamp system, comprising:
   a ring clamp comprising a first opening configured to receive a seat tube having an inner diameter, a first portion and a second portion separated by a second opening and extending outward from the clamp, a third opening extending through the first and second portions, and an inwardly curved surface along an outer surface of the second portion;
   a shaft configured to fit through the third opening;
   a pin having an opening configured to engage a first end of the shaft;
   a first lever having a cam surface and an opening on one end and a lever portion on an opposite end, wherein the opening engages a first portion of the pin; and
   a second lever having a cam surface and an opening on one end and a lever portion on an opposite end, wherein the opening of the second lever engages a second portion of the pin, wherein the inwardly curved surface of the ring clamp engages the cam surfaces of the first and second levers, and wherein the first and second levers are independently rotatable about the pin and with respect to each other to move the ring clamp for reducing the inner diameter of the seat tube.

15. The clamp system of claim 14, wherein the pin further comprises a second opening along an axis of rotation of the first and second levers.

16. The clamp system of claim 15, further comprising a screw adapted to engage the second opening of the pin to secure at least the first lever to the pin.

17. The clamp system of claim 14, further comprising a means for securing the shaft to the ring clamp.

18. The clamp system of claim 17, wherein the means comprises a threaded portion in the opening of the pin corresponding to a threaded end of the shaft.

19. The clamp system of claim 14, wherein the shaft is rotatable in the third opening of the ring clamp.

20. The clamp system of claim 14, wherein an axis of rotation of the first and second levers is to be perpendicular to an axis of rotation of the shaft.

21. The clamp system of claim 14, wherein an axis of rotation of the first and second levers is to be parallel to an axis of rotation of the seat post.

22. The clamp system of claim 14, wherein the lever portions of the first and second levers are curved inward toward the ring clamp.

23. The clamp system of claim 14, wherein the seat tube comprises an opening configured to reduce the diameter of the seat tube when the ring clamp is moved by the first and second levers to tighten the seat tube against a seat post.

* * * * *